United States Patent [19]
Itoh et al.

[11] Patent Number: 4,666,113

[45] Date of Patent: May 19, 1987

[54] DEVICE FOR MOUNTING COOKING APPARATUS

[75] Inventors: Fumihiko Itoh, Shiga; Tatumi Usagawa; Ryo Sakai, both of Ohtsu; Yasakao Yamamoto, Shiga, all of Japan

[73] Assignee: Sanyo Electric Co. Ltd., Japan

[21] Appl. No.: 795,097

[22] Filed: Nov. 5, 1985

[30] Foreign Application Priority Data

Apr. 3, 1985 [JP] Japan ................................ 60-70341

[51] Int. Cl.⁴ ........................................... F16M 11/00

[52] U.S. Cl. .................................. 248/201; 248/317; 312/245; 312/334; 219/10.55 R

[58] Field of Search ............... 248/201, 317, 287, 323; 312/334, 335, 301, 330 R, 311, 245; 126/19 R, 1 E, 18; 219/10.55 R; 108/102

[56] References Cited

U.S. PATENT DOCUMENTS

| | | | |
|---|---|---|---|
| 2,839,044 | 6/1958 | Phares | 126/19 R |
| 3,167,065 | 1/1965 | Del Francia | 126/19 R |
| 3,606,112 | 9/1971 | Cheshier | 312/334 |
| 3,685,879 | 8/1972 | Tsuji | 312/245 |
| 3,899,982 | 8/1975 | Fetzek | 312/335 |
| 4,313,043 | 1/1982 | White et al. | 219/10.55 R |
| 4,540,146 | 9/1985 | Basile | 248/201 |
| 4,580,754 | 4/1986 | Hughes | 248/201 |
| 4,580,853 | 4/1986 | Hitzeroth et al. | 248/317 |

FOREIGN PATENT DOCUMENTS

| | | | |
|---|---|---|---|
| 2903121 | 8/1980 | Fed. Rep. of Germany | 248/317 |
| 1408677 | 7/1965 | France | 248/201 |
| 2305916 | 10/1976 | France | 248/201 |
| 2042620 | 9/1980 | United Kingdom | 248/201 |

*Primary Examiner*—Cornelius J. Husar
*Assistant Examiner*—Anthony Knight
*Attorney, Agent, or Firm*—Handal & Morofsky

[57] ABSTRACT

The device for mounting a cooking apparatus of the present invention under a horizontal plate such as a bottom plate of wall cabinet comprises an upper flat metallic plate fixedly mounted on the upper surface of the horizontal plate and lower metallic fitting member fixedly mounted on the lower surface of the horizontal plate; sliding metallic member engaged on the lower metallic fitting member in a laterally slidable manner; and a stopper for fixing a relative position between the lower metallic fitting member and the sliding metallic member. The cooking apparatus is supported by hanging the engaging portions formed in the side end portions of the lower metallic fitting member and the sliding metallic member on handles provided on both the left and right side surfaces of the cooking apparatus. Accordingly, the cooking apparatus can be easily mounted on a bottom plate of wall cabinets and the like without any extra member to be mounted on the cooking apparatus, so that a cooking apparatus of the type originally used by being placed on a cooking counter and the like can be easily mounted under the bottom plate of a wall cabinet and the like.

12 Claims, 9 Drawing Figures

DEVICE FOR MOUNTING COOKING APPARATUS

BACKGROUND OF THE INVENTION

1. Field of the Invention

The present invention relates to a device for mounting a cooking apparatus such as a microwave oven under a horizontal plate such as a bottom plate of a wall cabinet in the kitchen.

2. Description of the Prior Art

In order to effectively utilize an open space above a cooking counter by mounting a cooking apparatus, which is usually used by being placed on the cooking counter and the like incorporated into a systematized kitchen, such as a microwave oven in the open space above the cooking counter, various kinds of device for mounting a cooking apparatus have been proposed. One of them is a devices disclosed in Japanese Utility Model Application Laid-Open No. 59-155411. In this device, metallic fitting members are fixedly mounted on the upper portion of a body of a cooking apparatus, locking metallic fixtures for detachably mounting said metallic fitting members being fixedly mounted on a bottom plate of a wall cabinet, and the metallic fitting members being suspended on the locking metallic fixtures thereby mounting the cooking apparatus in an open space above a cooking counter.

However, in this device, since the metallic fitting members are fixedly mounted on the upper portion of the body of cooking apparatus, said metallic fitting members are positioned at such a height that they tend to be touched by human hands and clothes when such a cooking apparatus is placed on said cooking counter corresponding to necessities in the same manner as in the conventional one. Because of this persons are injured by metallic fitting members fixedly mounted on the upper portion of the body of the cooking apparatus and clothes are caught on them and damaged. Also, since metallic fitting members are exposed, this device is not preferable in its external appearance.

OBJECT OF THE INVENTION

The present invention was achieved in view of the above described situations.

It is a first object of the present invention to provide a device for mounting a cooking apparatus simple in construction by which a cooking apparatus can be mounted under a horizontal plate such as a bottom plate of a wall cabinet or the like in a kitchen.

It is a second object of the present invention to provide a device for mounting a cooking apparatus by which a cooking apparatus can be mounted under a horizontal plate such as a bottom plate of a wall cabinet or the like in a kitchen without specially fixedly mounting extra metallic members and the like on a body of cooking apparatus.

It is a third object of the present invention to provide a device for mounting a cooking apparatus by which a cooking apparatus can be securely mounted under a horizontal plate such as a bottom plate of a wall cabinet and the like in a kitchen.

It is a fourth object of the present invention to provide a device for mounting a cooking apparatus in which a burden on the bottom plate of a wall cabinet and the like in a kitchen, on which a cooking apparatus is to be mounted, is small whereby there is no possibility of the fall of the cooking apparatus.

It is a fifth object of the present invention to provide a device for mounting a cooking apparatus in which there is no possibility that persons will be injured, clothes damaged, and an external appearance being spoiled when a cooking apparatus is used by being placed on a cooking counter by adopting the construction without requiring to fix members for mounting a cooking apparatus on the cooking apparatus.

The above and further objects and features of the invention will more fully be apparent from the following detailed description with reference to accompanying drawings.

DETAILED DESCRIPTION OF THE INVENTION

Figure 1:
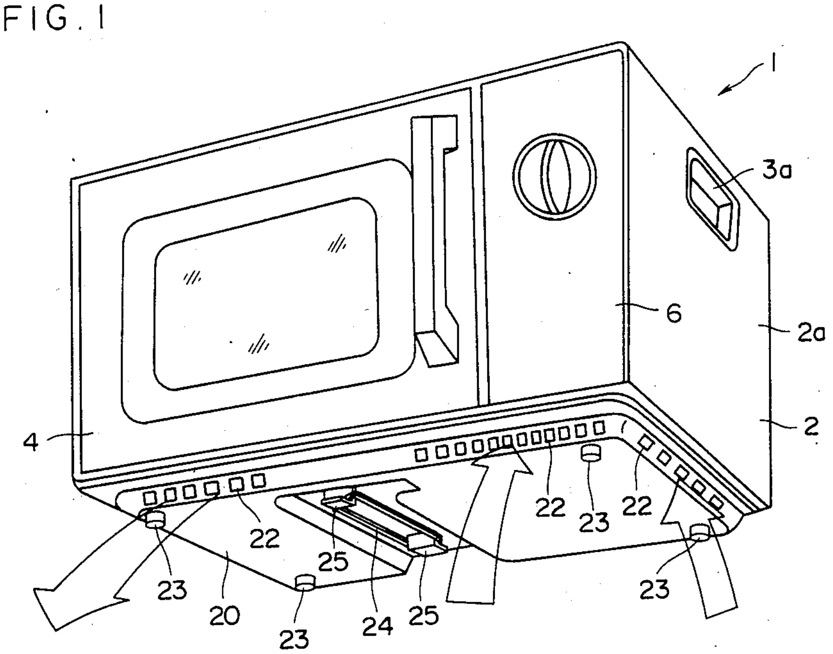
FIG. 1 is a schematic view showing a microwave oven as one example of a cooking apparatus viewed from the right-hand front lower side.
Figure 2:
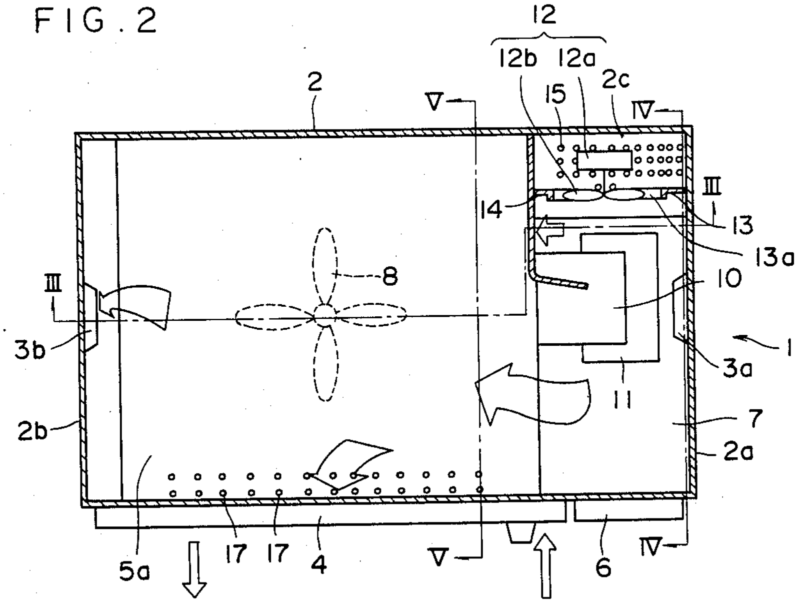
FIG. 2 is a horizontal sectional view showing a microwave oven.
Figure 3:
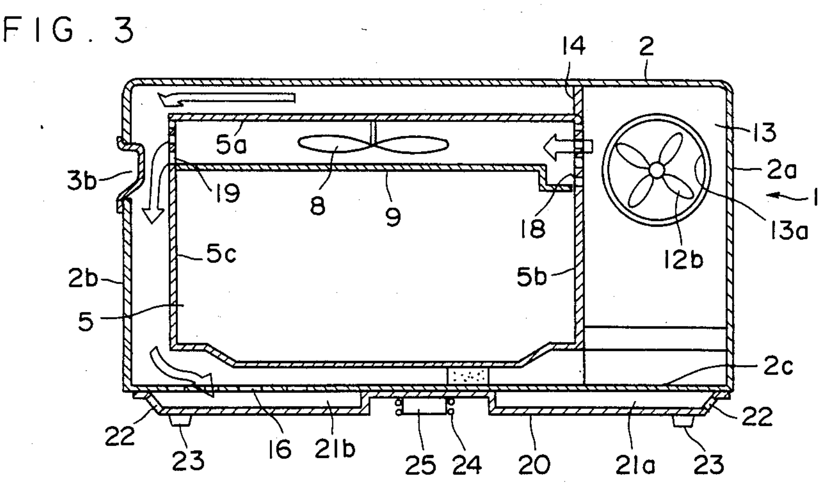
FIG. 3 is a vertical sectional view of FIG. 2 taken through the line III—III thereof.
Figure 4:
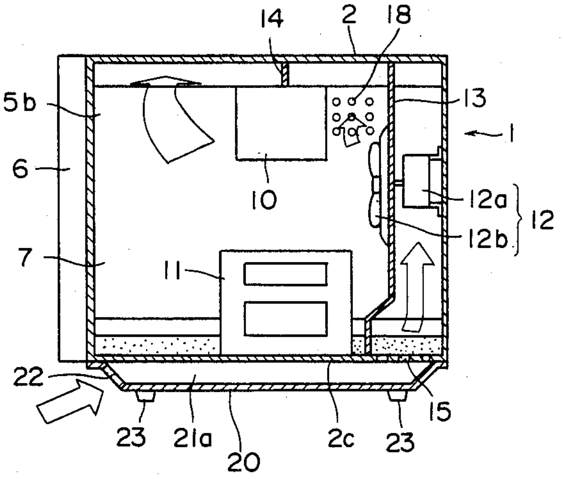
FIG. 4 is a vertical sectional view of FIG. 2 taken through the line IV—IV thereof.
Figure 5:
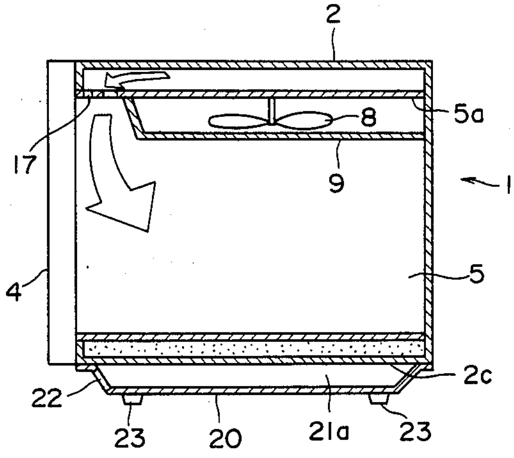
FIG. 5 is a vertical sectional view of FIG. 2 taken through the line V—V thereof.
Figure 6:
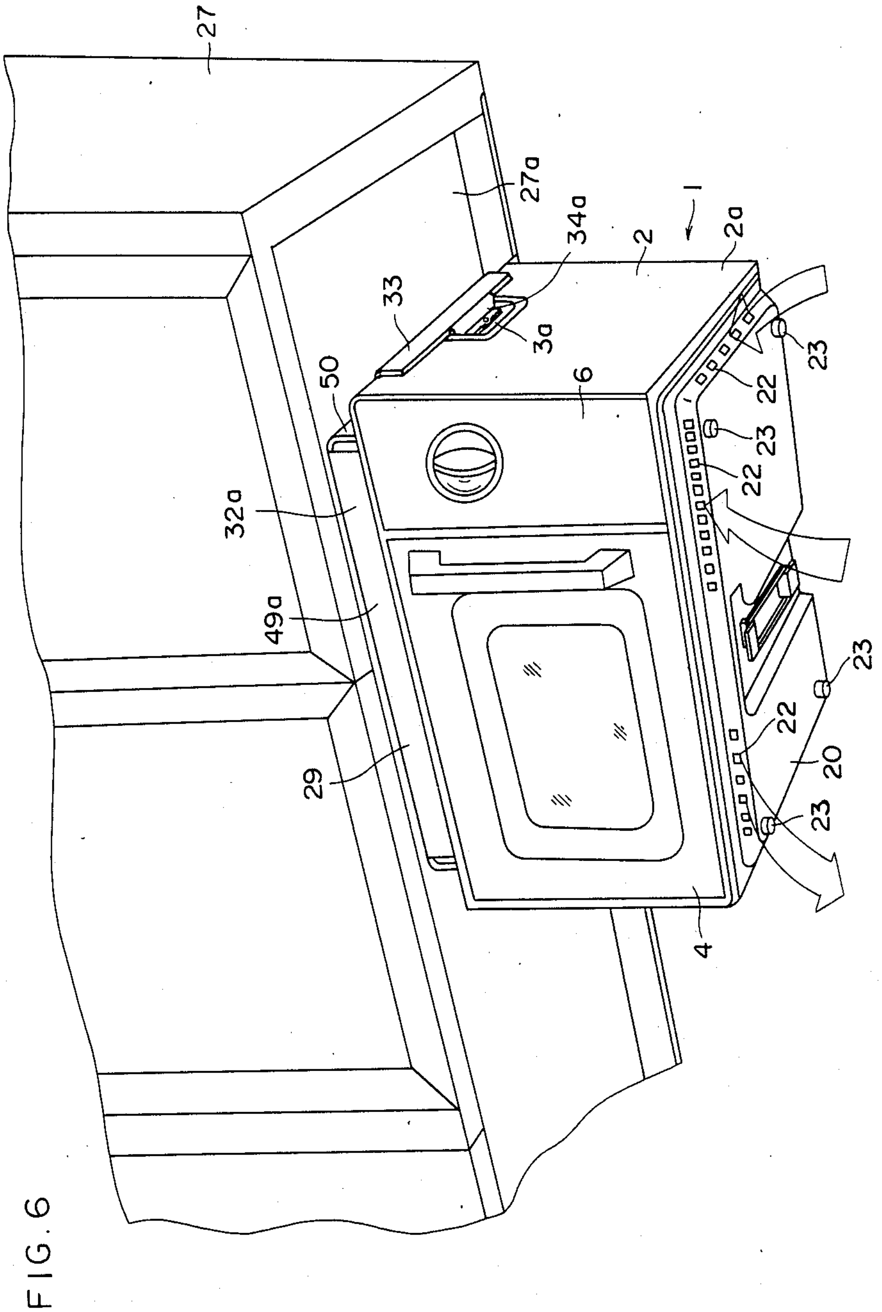
FIG. 6 is a schematic view showing the state of mounting a microwave oven under a wall cabinet by means of a device of the present invention viewed from the right-hand front lower side.

The present invention will be below described with reference to the drawings of the embodiments thereof.

FIGS. 1 to 5 show a microwave oven as a cooking apparatus to be mounted under a bottom plate and the like of a wall cabinet in a kitchen by means of a device of the present invention. A microwave oven body 1 is provided with handles 3*a*, 3*b* for carrying it on both right and left outer side walls 2*a*, 2*b* constructing the outer casing 2 thereof. The body 1 is provided with a microwave heating chamber 5, whose front opening is opened and closed by a door 4 and an electric apparatus chamber 7 positioned behind a control panel 6 for setting a cooking time, cooking temperature and the like therein.

The microwave heating chamber 5 is provided with a stirrer 8 for stirring microwaves and a stirrer cover 9 for covering the stirrer 8 arranged therein. The electric apparatus chamber 7 comprises a magnetron 10 for generating microwaves for heating foodstuffs in the heating chamber 5, a high-voltage transformer 11 for applying a high voltage to the magnetron 10, a cooling device 12 comprising a motor 12*a* and a fan 12*b* for cooling the magnetron 10, the high-voltage transformer 11 and the like arranged therein. In addition, the electric apparatus chamber 7 is provided with a vertical partition wall 13 at the rear portion thereof and a L-shaped partition wall 14 above the heating chamber 5 of the rear side portion thereof. The vertical partition wall 13 is provided with an opening 13a in the upper portion thereof, the fan 12b of the cooling device 12 being positioned within the opening 13a.

Upon driving the cooling device 12, air is sucked as a cooling fluid into the rear portion of the vertical partition wall 13 provided in the electric apparatus chamber 7 through a large number of suction holes 15 formed in the rear portion of an outer bottom wall 2c on the electric apparatus chamber 7 side and then discharged forward the electric apparatus chamber 7 through the opening 13a of the vertical partition wall 13 to cool the magnetron 10, the high-voltage transformer 11 and the like. Then a part of the air is flown through a portion where the L-shaped partition wall 14 does not exist, the upper portion outside the heating chamber 5, the left side of the heating chamber 5 downwardly and a large number of discharge holes 16 formed on the left side of the outer bottom wall 2c through which the air is discharged outside.

Also, part of the air flown up to the upper portion of the heating chamber 5 is flown along the inside surface of the door 4 to the lower portion inside the heating chamber 5 through a small hole 17 formed in the front portion of the upper wall 5a of the heating chamber 5. Then, in order to carry out the ventilation of the inside of the heating chamber, this air is flown through a passage (not shown) along with water vapour and the like generated from foodstuffs when heated by microwaves to reach the left side of the heating chamber 5 where it joins the air coming from the upper portion outside the heating chamber 5.

On the other hand, the rest of the air discharged forward the electric apparatus chamber 7 is flown up to the upper portion inside the heating chamber 5, through a small hole 18 formed on the right-hand wall 5b of the heating chamber 5 below the L-shaped partition wall 14, where it rotates the stirrer 8. Then this air is flown through a small hole 19 formed in the left-hand wall 5c of the heating chamber 5 to arrive at the left side of the heating chamber 5 and also joins the air coming from the upper portion of the heating chamber 5.

The microwave oven body 1 is provided with also a synthetic resin structure 20 fixedly mounted on the lower portion thereof. The structure 20 is provided with a right-hand projecting portion 21a and a left-hand projecting portion 21b, which project downward, on the right side and left side thereof respectively, the both projecting portions 21a, 21b being provided with an air hole 22 on the front portion and side portion thereof respectively. The right-hand projecting portion 21a communicates with the rear portion inside the electric apparatus chamber 7 through the suction hole 15 of the outer bottom wall 2c. Accordingly, air is sucked into the rear portion inside the electric apparatus chamber 7 through the right projecting portion 21a from the lower front side and the right side of the microwave oven body 1. Also, the left projecting portion 21b communicates with the left side of the heating chamber 5 inside the outer casing 2 through the discharge hole 16 of the outer bottom wall 2c. Accordingly, air coming to the left side of the heating chamber 5 is discharged toward the lower front side and the left side of the microwave oven body 1 through the left projecting portion 21b. In addition, the structure 20 is provided with support legs

23, 23 . . . at four corners of the lower surface thereof fixedly mounted integrally thereon and holders 25, 25 for holding a power source cord 24 wound therearound integrally fixedly mounted on the lower surface between the right projecting portion 21a and the left projecting portion 21b.

A microwave oven constructed in the above described manner is usually used by being placed on a cooking counter and the like incorporated into a systematized kitchen, and it can also be lifted up by means of both handles 3a, 3b to be easily carried to other places if necessary.

Moreover, in order to effectively utilize a space above a cooking counter, a cooking apparatus as above described can be suspended in an open space such as the space under the wall cabinet. A device in mounting a cooking apparatus for that manner, that is to say a device of the present invention will be below described.

Referring to FIGS. 6 to 9, the upper metallic flat plate 28 is arranged on a bottom plate 27a of a wall cabinet 27 serving as a high-place horizontal plate above a cooking counter 26 and the lower metallic fitting member 29 is arranged under the bottom plate 27a of a wall cabinet. The upper metallic flat plate 28 and the lower metallic fitting member 29 are fixedly mounted on the bottom wall 27a of a wall cabinet 27 in a mutually connected manner by screwing a plurality of screws 30, 30 . . . in female screw portions 31, 31 . . . which are integrally fixedly mounted on the lower metallic fitting member 29 in opposition to the screws 30 with putting the bottom plate 27a of a wall cabinet 27 between the screws 30, 30 . . . and the female screw portions 31, 31 . . . .

The lower metallic fitting member 29 is provided with a front guide 32a and a rear guide 32b, which extend laterally and are bent downwardly from a base plate 29a, in the front and rear portion thereof respectively. Both guides 32a, 32b consist of a front guide member 49a and a rear guide member 49b formed by bending the front and rear edge portion of the base plate 29a downward and folded portions 49c, 49d bent inwardly from the lower end of the guide members 49a, 49b respectively, and have a L-shaped section.

In addition, the lower metallic fitting member 29 is provided with a bent portion 33 on the right-hand side portion thereof. This bent portion 33 consists of a hanging down portion 50 bent downwardly from the base plate 29a, a horizontal portion 50a bent rightward and outward from the lower end of the hanging down portion 50 and a second hanging down portion 50b bent downward from the outer end of the horizontal portion 50a and has a Z-shaped section. The bent portion 33 is provided with a right engaging portion 34a, on which the right-hand handle 3a of the microwave oven body 1 is engaged, formed by bending the central portion of the lower side thereof. This right engaging portion 34a consists of a horizontal portion bent inward from the central portion of the lower edge of the second hanging down portion 50b and a hanging down portion bent downward from the inner end of the horizontal portion and provided with a threaded hole.

Furthermore, the lower metallic fitting member 29 is provided with laterally slidable sliding metallic member 35 on the left side thereof. The sliding metallic member 35 is provided with a front sliding portion 36a and a rear sliding portion 36b laterally extending and bent downward from a base plate 35a in the front portion and rear portion thereof. The whole of the sliding metallic member 35 is laterally slidable relatively to the lower metallic fitting member 29 by moving the sliding portions 36*a*, 36*b* laterally along a portion surrounded by the base plate 29*a*, the front guide member 49*a* of the front guide 32*a* and the folded portion 49*c* and a portion surrounded by the base plate 29*a*, the rear guide member 49*b* of the rear guide 32*b* and the folded portion 49*d*.

The sliding metallic member 35 is provided with a bent portion 37 formed by bending in the left-hand portion thereof. This bent portion 37 has the same construction as that of the bent portion 33 formed by bending in the right-hand portion of the lower metallic fitting member 29. That is to say, the bent portion 37 consists of a hanging down portion 37*a* bent downwardly from the base plate 35*a*, a horizontal portion 37*b* bent leftward and outward from the lower end of the hanging down portion 37*a* and a second hanging down portion 37*c* bent downward from the outer end of the horizontal portion 37*b* and has a Z-shaped section. This bent portion 37 is provided with a left engaging portion 34*b*, on which the left handle 3*b* of the microwave oven body 1 is engaged, formed by bending the central portion of the lower side thereof. This left engaging portion 34*b* consists of a horizontal portion bent inward from the central portion of the lower edge of the second hanging down portion 37*c* and a hanging down portion bent downward from the inner end of the horizontal portion and provided with a threaded hole.

Also, the sliding metallic member 35 is provided with cut-off portions 38*a*, 38*b*, which extend laterally and are opened at its right end, formed at a portion to the front end a portion to the rear end of a base plate 35*a* thereof respectively, and the cut-off portions 38*a*, 38*b* are provided with slits 39*a*, 39*b* extending laterally at a portion to the center thereof respectively. The slits 39*a*, 39*b* of the base plate 35*a* are provided with projections 40*a*, 40*b* projecting downward formed by pressing at a portion positioned on the right side thereof respectively.

A stopper 41 is provided so as to dispose under the sliding metallic member 35 when the sliding metallic member 35 is slidably incorporated in the lower metallic fitting member 29. This stopper 41 is screwed in female screw portions 42*a*, 42*b* formed under the portion to the left end of the lower metallic fitting member 29 so as to project downward by means of screws 43*a*, 43*b*. The female screw portions 42*a*, 42*b* are positioned within the slits 39*a*, 39*b* when the sliding metallic member 35 is incorporated in the lower metallic fitting member 29. The stopper 41 is bent downward at the left end portion thereof to form a hanging down piece 44.

Accordingly, the sliding metallic member 35 is slidable within the lower metallic fitting member 29 as far as the position where the left end portion of the projections 40*a*, 40*b* are contacted with the stopper 41 in the leftward direction and, on the other hand, as far as the position where the hanging down portion 37*a* of the bent portion 37 of the left-hand portion is contacted with the hanging down piece 44 of the stopper 41 in the rightward direction. At this juncture, the cut-off portions 38*a*, 38*b* move so as to receive two left-hand female screw portions 31, 31 fixedly mounted on the lower surface of the lower metallic fitting member 29 therein.

The mounting of a microwave oven as a cooking apparatus on the bottom plate 27*a* of the wall cabinet 27 by means of the upper metallic flat plate 28, the lower metallic fitting member 29 and the sliding metallic member 35 is carried out as follows:

At first, the microwave oven body 1 is lifted up above the cooking counter 26, the right handle 3*a* of the right-hand outer side wall 2*a* being engaged with the right engaging portion 34*a* of the lower metallic fitting member 29, and the sliding metallic member 35 being slid rightward as far as the position where the hanging down portion 37*a* is engaged with the hanging down piece 44 of the stopper 41. Then, the left engaging portion 34 is engaged with the handle 3*b* of the left-hand outer side wall 2*b* and subsequently the sliding metallic member 35 is locked not so as to unnecessarily slide. Thus the microwave oven is mounted under the wall cabinet 27.

Figure 7:
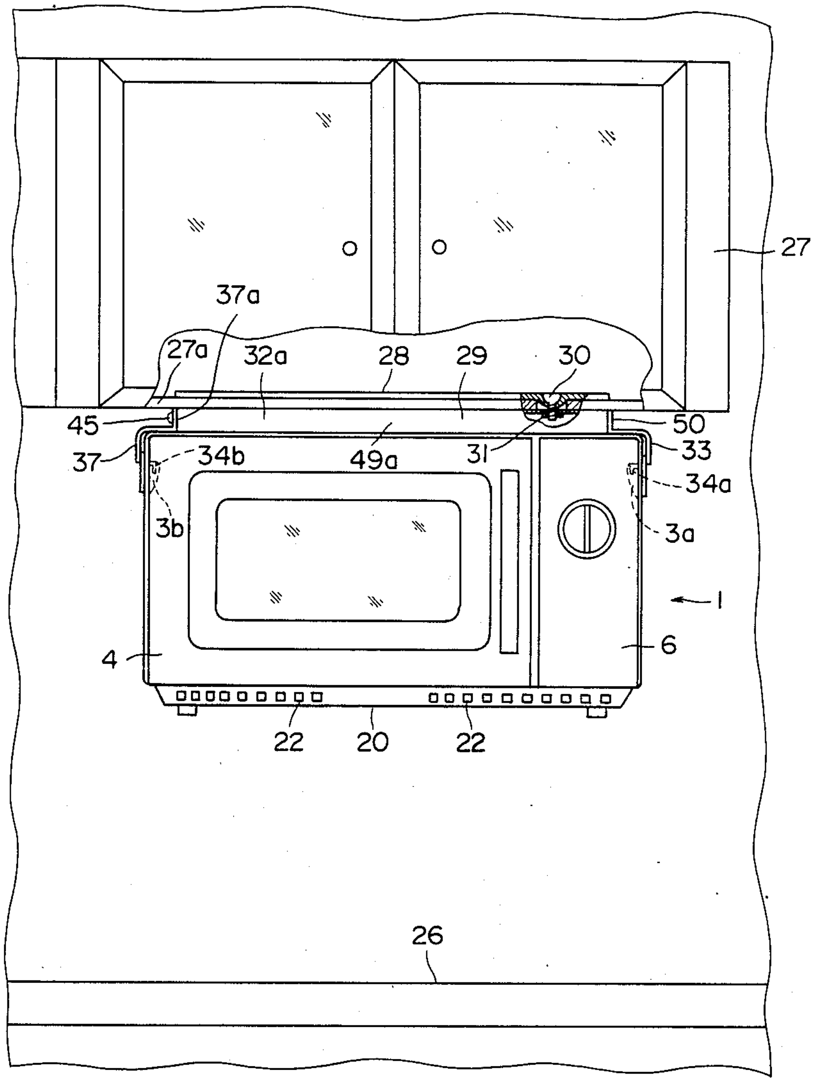
FIG. 7 is a schematic view showing the state of mounting a microwave oven under a wall cabinet by means of a device of the present invention viewed from the front side.
Figure 8:
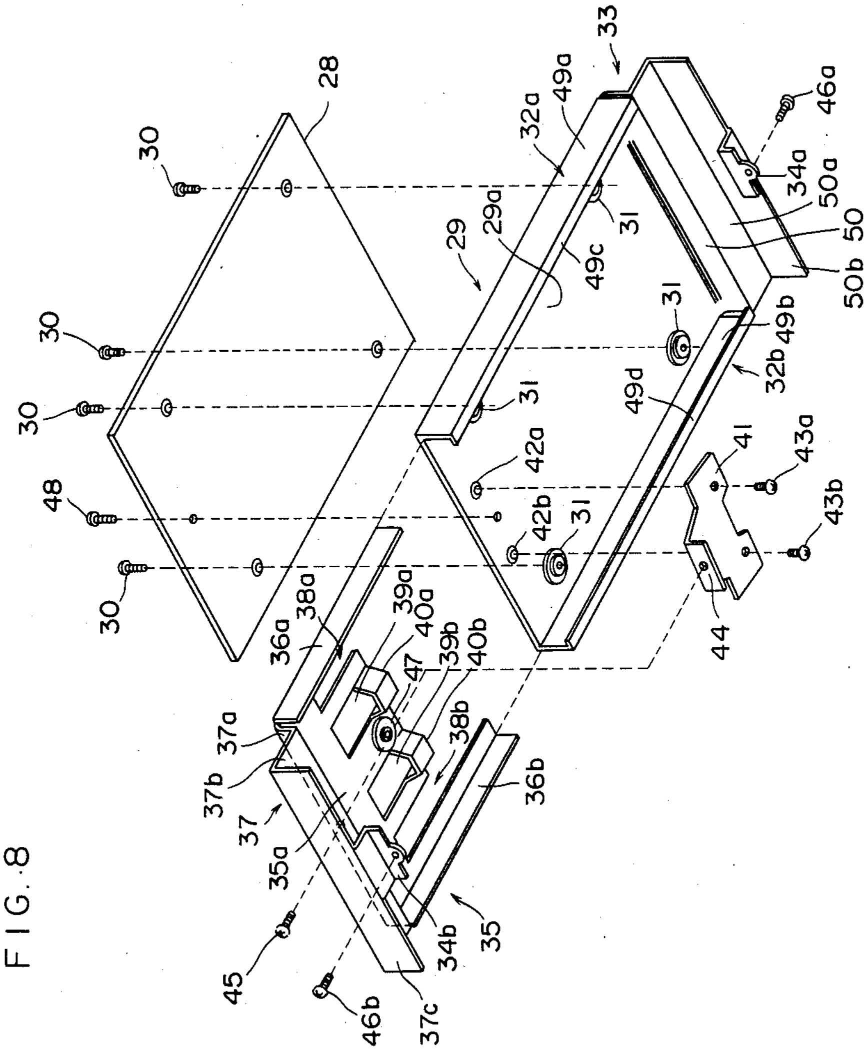
FIG. 8 is an exploded view showing a device of the present invention viewed from the left-hand front lower side.
Figure 9:
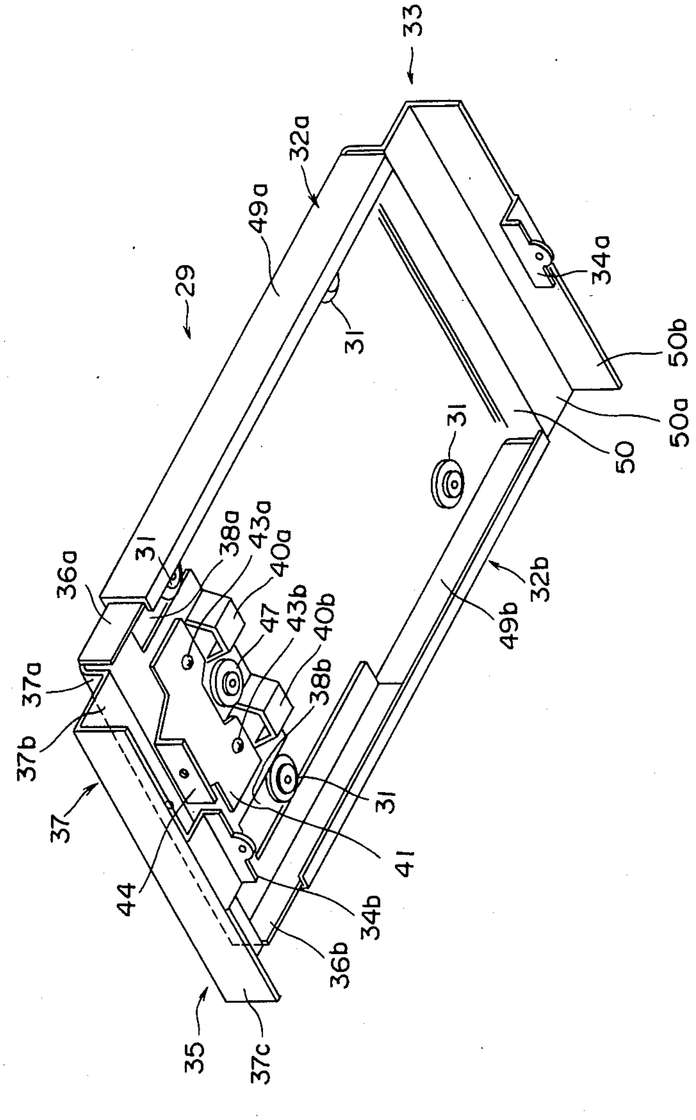
FIG. 9 is a schematic view showing the state of assembling a device of the present invention viewed from the left-hand front lower side.

The methods of fixedly mounting the sliding metallic member 35 include the following three methods: it is necessary only to suitably select one of them depending upon the state of the place where the microwave oven is to be mounted. In the first method, the hanging down portion 37*a* of the sliding metallic member 35 is screwed in the hanging down piece 44 of the stopper 41 by means of a screw 45. In the second method, the right engaging portion 34*a* and the left engaging portion 34*b* are screwed in handles 3*a*, 3*b* by means of screws 46*a*, 46*b* respectively. Finally, in the third method, a screw 48 is screwed in a female screw portion 47 integrally fixedly mounted on the sliding metallic member 35 through the upper metallic flat plate 28 and the lower metallic fitting member 29. FIG. 7 shows the case where the first method is selected.

Under the condition that the microwave oven is mounted by hanging it on the bottom plate 27*a* as the horizontal plate of the wall cabinet 27, the weight of the microwave oven is not concentrically applied to the vicinity of the screw 30 of the bottom plate 27*a* of the wall cabinet but uniformly applied to the bottom plate 27*a* of the wall cabinet through the whole surface of the upper metallic flat plate 28 and as a result, the bottom plate 27*a* of the wall cabinet is not easily broken and the fall and the like of the microwave oven are practically impossible.

In addition, the space between the bottom plate 27*a* of the wall cabinet and the microwave oven body 1 is screened by the front guide members 49*a*, 49*b* of the front and rear guides 32*a*, 32*b* and the hanging down portion 50 of the bent portion 33 of the lower metallic fitting member 29 and the hanging down portion 37*a* of the bent portion 37 of the sliding metallic member 35, so that an external appearance is also preferable.

A microwave oven mounted in the described manner can be easily removed from the bottom plate 27*a* as a horizontal plate of the wall cabinet 27 by the operations reverse to the above described ones. The removed microwave oven can be used by being placed on the cooking counter 26 and the like.

As described above, according to the present invention, a device for mounting a cooking apparatus, which is simple in construction and capable of mounting a cooking apparatus on a high place by using handles without fixedly mounting extra metallic members on a cooking apparatus body whereby being capable of preventing that the cooking apparatus injures persons and catches clothes when the cooking apparatus is used by being placed on the cooking counter and the like if necessary, and being superior also in external appearance, can be provided.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within meets and bounds of the claims, or equivalence of such meets and bounds thereof are therefore intented to be embraced by the claims.

What is claimed is:

1. A device for mounting under a horizontal plate a cooking apparatus having carrying handles on both the left side surface and the right side surface thereof, comprising;

an upper flat plate configured to be disposed on the upper surface of said horizontal plate;

a lower fitting member provided with an engaging portion at one side thereof configured to engage one of said handles, positioned under said horizontal plate and connected to said upper flat plate, with said horizontal plate disposed between said upper plate and said lower fitting member, to fixedly mount said lower fitting member on said horizontal plate together with said upper flat plate;

a sliding member configured and dimensioned to be mounted on said lower fitting member in a laterally slidable manner and provided with an engaging portion positioned opposite said one side to be engaged with the other of said handles; and a locking member for fixing the relative position between said sliding member and said lower fitting member when said engaging portion of said lower fitting member is engaged with one of said handles while said engaging portion of said sliding member is engaged with the other of said handles.

2. A device for mounting a cooking apparatus under a horizontal plate as set forth in claim 1, wherein said lower fitting member is provided with laterally extending front guide and rear guide members in the front and rear portion thereof respectively, and said sliding metallic member is provided with sliding portions to be slidably engaged with said guide members, respectively.

3. A device for mounting a cooking apparatus under a horizontal plate as set forth in claim 1, wherein the front portion, the rear portion and the side portion provided with the engaging portion of said lower fitting member and the side portion provided with the engaging portion of said sliding member are provided with a downward bent portion respectively to screen the space between the lower surface of said horizontal plate and the upper surface of said cooking apparatus.

4. A device for mounting a cooking apparatus under a horizontal plate as set forth in claim 3, wherein said front and rear bent portion of said lower fitting member are provided with the laterally extending front guide member and rear guide member respectively, said sliding member being provided with a sliding portion slidably engaged with said front guide member and said rear guide member respectively.

5. A device for mounting a cooking apparatus under a horizontal plate as set forth in claim 1, wherein said lower fitting member is provided with a stopper for prohibiting the lateral slide of said sliding member.

6. A device for mounting a cooking apparatus under a horizontal plate as set forth in claim 1, wherein said locking member is a plurality of screws for fixing said both engaging portions on said both handles respectively.

7. A device for mounting a cooking apparatus under a horizontal plate as set forth in claim 5, wherein said locking member fixes said sliding member on said stopper.

8. A device for mounting a cooking apparatus under a horizontal plate as set forth in claim 7, wherein said locking member is a screw.

9. A device for mounting a cooking apparatus under a horizontal plate as set forth in claim 1, wherein said locking member is a screw passing through said horizontal plate and said lower fitting member from the upper side of said upper flat plate and fixedly mounted on said sliding member.

10. A device as in claim 1, wherein said upper flat plate, said lower fitting member, and said sliding member are made of a metallic material.

11. A device as in claim 1, wherein said sliding member is configured and dimensioned to slide between a first position where said engaging portion of said sliding member and said engaging portion of said lower fitting member are positioned apart from each other by a first distance which enables both of said engaging portions to engage said carrying handles on said cooking apparatus and a position where said engaging portions are separated by a second distance greater than said first distance.

12. A device as in claim 1 wherein said engaging portion on said lower fitting member is fixed relative to said horizontal plate.

* * * * *